(12) United States Patent
   Tanaka

(10) Patent No.:     US 12,644,724 B2
(45) Date of Patent:        Jun. 2, 2026

(54) APPARATUS, METHOD, AND COMPUTER PROGRAM FOR DETERMINING SECTIONS FOR MAP UPDATE

(71) Applicant: TOYOTA JIDOSHA KABUSHIKI KAISHA, Toyota (JP)

(72) Inventor: Masahiro Tanaka, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 476 days.

(21) Appl. No.: 18/183,623

(22) Filed: Mar. 14, 2023

(65) Prior Publication Data

US 2023/0296401 A1     Sep. 21, 2023

(30) Foreign Application Priority Data

Mar. 16, 2022     (JP) ................................. 2022-041887

(51) Int. Cl.
   *G01C 21/00*        (2006.01)
   *G01C 21/34*        (2006.01)
(52) U.S. Cl.
   CPC ..... *G01C 21/3815* (2020.08); *G01C 21/3453* (2013.01)
(58) Field of Classification Search
   CPC ........... G01C 21/3815; G01C 21/3453; G01C 21/3859; G01C 21/3694; G01C 21/3804; G01C 21/3837
   USPC ...................................................... 701/450
   See application file for complete search history.

(56) References Cited

U.S. PATENT DOCUMENTS

| | | | | |
|---|---|---|---|---|
| 11,782,451 B1* | 10/2023 | Venkatraman | ....... | G05D 1/0221 |
| | | | | 701/26 |
| 2017/0010613 A1* | 1/2017 | Fukumoto | ........ | G08G 1/096844 |
| 2017/0122749 A1 | 5/2017 | Urano et al. | | |
| 2018/0107216 A1* | 4/2018 | Beaurepaire | ....... | G06Q 30/0261 |
| 2019/0063929 A1 | 2/2019 | Ohyama et al. | | |
| 2019/0301891 A1* | 10/2019 | Rowitch | ............ | G01C 21/3694 |
| 2019/0339709 A1* | 11/2019 | Tay | ......................... | G06F 16/23 |

(Continued)

FOREIGN PATENT DOCUMENTS

| | | |
|---|---|---|
| CN | 106996793 A | 8/2017 |
| CN | 113168762 A | 7/2021 |

(Continued)

*Primary Examiner* — Fadey S. Jabr
*Assistant Examiner* — Paula L Schneider
(74) *Attorney, Agent, or Firm* — Sughrue Mion, PLLC

(57)          ABSTRACT

An apparatus for determining sections for map update includes a processor configured to select, for each of pairs of two locations selected from among a plurality of locations at which vehicles can enter or exit a predetermined region, a series of road sections connecting the two locations from among a plurality of road sections as a route between the two locations, calculate, for each of the pairs, a score indicating the degree of improvement of drivers' convenience provided by generating or updating map information, based on one or more candidate sections where the map information is unavailable among individual road sections included in the route between the two locations, and identify the candidate sections included in the route of each of a predetermined number of pairs among the pairs of two locations in descending order of the score as target road sections for generating or updating the map information.

7 Claims, 7 Drawing Sheets

(56)             References Cited

U.S. PATENT DOCUMENTS

| | | |
|---|---|---|
| 2020/0116509 A1 | 4/2020 | Sakaguchi et al. |
| 2020/0239025 A1* | 7/2020 | Nagy ..................... G05D 1/646 |
| 2021/0239476 A1* | 8/2021 | Duym ................ G01C 21/3446 |
| 2021/0364306 A1 | 11/2021 | Igarashi |
| 2022/0032948 A1 | 2/2022 | Kudo |
| 2022/0082395 A1* | 3/2022 | Sasaki ..................... H04W 4/46 |

FOREIGN PATENT DOCUMENTS

| | | |
|---|---|---|
| JP | 2008-145333 A | 6/2008 |
| JP | 2019-40176 A | 3/2019 |
| JP | 2020-60528 A | 4/2020 |
| JP | 2020-173208 A | 10/2020 |
| JP | 6798779 B2 | 12/2020 |
| JP | 2021-81927 A | 11/2021 |

* cited by examiner

FIG. 7

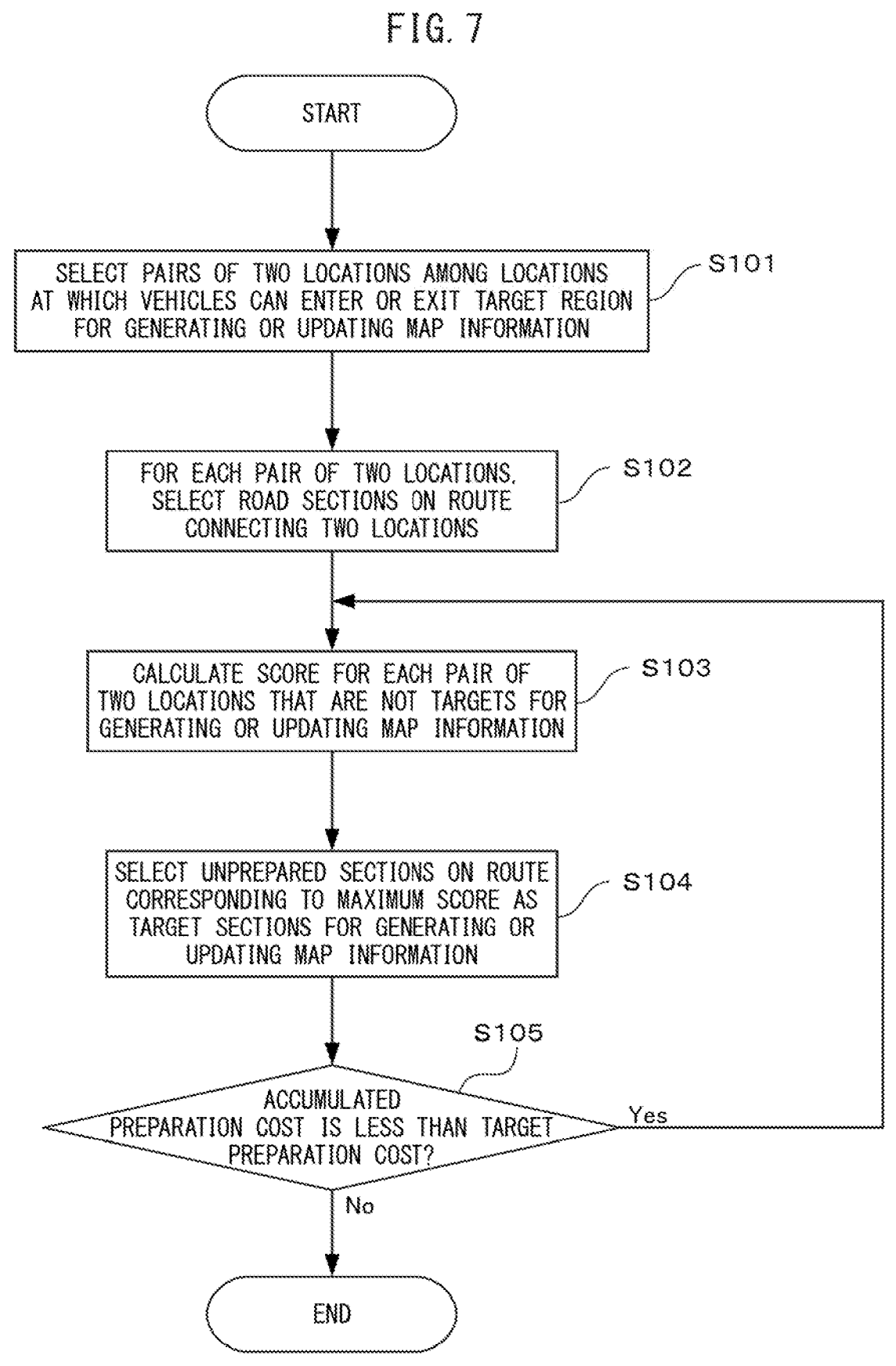

START

SELECT PAIRS OF TWO LOCATIONS AMONG LOCATIONS
AT WHICH VEHICLES CAN ENTER OR EXIT TARGET REGION
FOR GENERATING OR UPDATING MAP INFORMATION — S101

FOR EACH PAIR OF TWO LOCATIONS,
SELECT ROAD SECTIONS ON ROUTE
CONNECTING TWO LOCATIONS — S102

CALCULATE SCORE FOR EACH PAIR OF
TWO LOCATIONS THAT ARE NOT TARGETS FOR
GENERATING OR UPDATING MAP INFORMATION — S103

SELECT UNPREPARED SECTIONS ON ROUTE
CORRESPONDING TO MAXIMUM SCORE AS
TARGET SECTIONS FOR GENERATING OR
UPDATING MAP INFORMATION — S104

S105

ACCUMULATED
PREPARATION COST IS LESS THAN TARGET
PREPARATION COST?        Yes

No

END

APPARATUS, METHOD, AND COMPUTER PROGRAM FOR DETERMINING SECTIONS FOR MAP UPDATE

FIELD

The present invention relates to an apparatus, a method, and a computer program for determining target road sections for generating or updating map information.

BACKGROUND

High-precision maps to which an autonomous vehicle driving system refers for autonomous driving control of a vehicle are required to accurately represent information on those features on or around roads which relate to travel of vehicles. Thus, a technique to determine the necessity of update of map information on the basis of information from vehicles actually traveling on roads has been proposed (see Japanese Unexamined Patent Publication JP2019-40176A).

An information processor disclosed in JP2019-40176A determines, for each area, the necessity of update of a map of the area, based on at least the degree of change from a road shape represented in the map to a current road shape or the number of occurrences of a predetermined action of a vehicle that traveled the area.

SUMMARY

To generate or update map information of a region, a vehicle actually travels the region to generate data including information on features at locations in the region, and transmits the generated data through a communication channel to a device that generates or updates map information. Thus, various costs including a communication cost are incurred to collect data including information on features and to generate or update map information on the basis of the collected data. However, there is a limit to man-hours or budget available for generating or update map information. Thus, it is desirable to determine target road sections for generating or updating map information, i.e., target road sections for collecting data including information on features so that vehicle drivers can have the maximum advantage of autonomous driving control within limited man-hours or budget.

It is an object of the present invention to provide an apparatus that determines target road sections for generating or updating map information so that drivers are likely to have the advantage of autonomous driving control.

According to an embodiment, an apparatus for determining sections for map update is provided. The apparatus includes a memory configured to store, for each of a plurality of road sections included in a predetermined region, a map flag indicating whether map information for a vehicle to travel through the road section by autonomous driving is available; and a processor configured to: select, for each of pairs of two locations selected from among a plurality of locations at which vehicles can enter or exit the predetermined region, a series of road sections connecting the two locations from among the plurality of road sections as a route between the two locations, identify, for each of the pairs of two locations, one or more road sections where the map information is unavailable among individual road sections included in the route between the two locations as one or more candidate sections by referring to the map flag, calculate, for each of the pairs of two locations, a score indicating the degree of improvement of drivers' convenience provided by generating or updating the map information, based on the identified candidate sections, and identify the candidate sections included in the route of each of a predetermined number of pairs among the pairs of two locations in descending order of the degree of improvement of drivers' convenience indicated by the score as target road sections for generating or updating the map information.

For each of the plurality of road sections, the memory of the apparatus preferably further stores a traffic volume of the road section, an autonomous driving cost indicating a driver's load for the case where a vehicle travels through the road section by autonomous driving using the map information, a manual driving cost indicating a driver's load for the case where a vehicle travels through the road section by the driver's manual driving, and a map preparation cost required to generate or update the map information regarding the road section. For each of the pairs of two locations, the processor preferably calculates the total of differences between the manual driving cost and the autonomous driving cost of each of the candidate sections included in the route of the pair as the score, each of the differences being weighted with the ratio of the traffic volume to the map preparation cost.

Alternatively, for each of the plurality of road sections, the memory of the apparatus preferably further stores a traffic volume of the road section, an autonomous driving cost indicating a driver's load for the case where a vehicle travels through the road section by autonomous driving using the map information, and a manual driving cost indicating a driver's load for the case where a vehicle travels through the road section by the driver's manual driving. For each of the pairs of two locations, the processor preferably calculates the total of differences between the manual driving cost and the autonomous driving cost of each of the candidate sections included in the route of the pair as the score, each of the differences being weighted with the traffic volume.

Alternatively, for each of the plurality of road sections, the memory of the apparatus preferably further stores a traffic volume of the road section, a manual driving cost indicating a driver's load for the case where a vehicle travels through the road section by the driver's manual driving, and a map preparation cost required to generate or update the map information regarding the road section. For each of the pairs of two locations, the processor preferably calculates the total of values of the manual driving cost of each of the candidate sections included in the route of the pair as the score, each of the values being weighted with the ratio of the traffic volume to the map preparation cost.

For each of the plurality of road sections, the memory of the apparatus preferably further stores a map preparation cost required to generate or update the map information regarding the road section. Until the sum of the map preparation costs of road sections identified as target road sections for generating or updating the map information reaches a target preparation cost, the processor preferably identifies the candidate sections included in the route of each of the pairs among the pairs of two locations in descending order of the degree of improvement of drivers' convenience indicated by the score as target road sections for generating or updating the map information.

According to another embodiment, a method for determining sections for map update is provided. The method includes selecting, for each of pairs of two locations selected from among a plurality of locations at which vehicles can enter or exit a predetermined region, a series of road sections connecting the two locations from among a plurality of road sections included in the predetermined region as a route between the two locations; and identifying, for each of the pairs of two locations, one or more candidate sections among individual road sections included in the route between the two locations by referring to a map flag indicating, for each road section included in the route of the pair, whether map information for a vehicle to travel through the road section by autonomous driving is available. The candidate sections are road sections where map information is unavailable. The method further includes calculating, for each of the pairs of two locations, a score indicating the degree of improvement of drivers' convenience provided by generating or updating the map information, based on the identified candidate sections; and identifying the candidate sections included in the route of each of a predetermined number of pairs among the pairs of two locations in descending order of the degree of improvement of drivers' convenience indicated by the score as target road sections for generating or updating the map information.

According to still another embodiment, a non-transitory recording medium that stores a computer program for determining sections for map update is provided. The computer program includes instructions causing a computer to execute a process including selecting, for each of pairs of two locations selected from among a plurality of locations at which vehicles can enter or exit a predetermined region, a series of road sections connecting the two locations from among a plurality of road sections included in the predetermined region as a route between the two locations; and identifying, for each of the pairs of two locations, one or more candidate sections among individual road sections included in the route between the two locations by referring to a map flag indicating, for each road section included in the route of the pair, whether map information for a vehicle to travel through the road section by autonomous driving is available. The candidate sections are road sections where map information is unavailable. The process further includes calculating, for each of the pairs of two locations, a score indicating the degree of improvement of drivers' convenience provided by generating or updating the map information, based on the identified candidate sections; and identifying the candidate sections included in the route of each of a predetermined number of pairs among the pairs of two locations in descending order of the degree of improvement of drivers' convenience indicated by the score as target road sections for generating or updating the map information.

The apparatus according to the present disclosure has an advantageous effect of being able to determine target road sections for generating or updating map information so that drivers are likely to have the advantage of autonomous driving control.

BRIEF DESCRIPTION OF DRAWINGS

FIG. 7 is an operation flowchart of the section determination process.

DESCRIPTION OF EMBODIMENTS

An apparatus for determining sections for map update, a method therefor executed by the apparatus, and a computer program therefor will now be described with reference to the attached drawings. The apparatus determines target road sections for generating or updating map information used in autonomous driving control from among a plurality of road sections included in a target region for generating or updating the map information so that many drivers can have the advantage of autonomous driving control. The map information used in autonomous driving control includes information on features related to travel of vehicles (e.g., road markings such as lane-dividing lines, traffic signs such as instruction signs, and curbstones of roads). The apparatus selects various pairs of two locations from a plurality of locations at which vehicles can enter or exit a target region for generating or updating the map information. For each selected pair of two locations, the apparatus further selects a series of road sections connecting the two locations from a plurality of road sections included in the region as a route between the two locations. For each of the pairs of two locations, the apparatus further identifies one or more road sections where the map information is unavailable among individual road sections included in the route between the two locations. In the following, a road section where the map information is unavailable will be referred to as an "unprepared section." For each route, the apparatus calculates a score indicating the degree of improvement of drivers' convenience provided by generating or updating the map information, based on the identified unprepared sections. The apparatus then identifies the unprepared sections included in the route of each of a predetermined number of pairs among the routes of the pairs of two locations in descending order of the score as target road sections for generating or updating the map information. Regarding the determined road sections, the apparatus then notifies an instruction to collect data representing features related to travel of vehicles (hereafter "feature data") to a vehicle capable of generating feature data.

Figure 1:
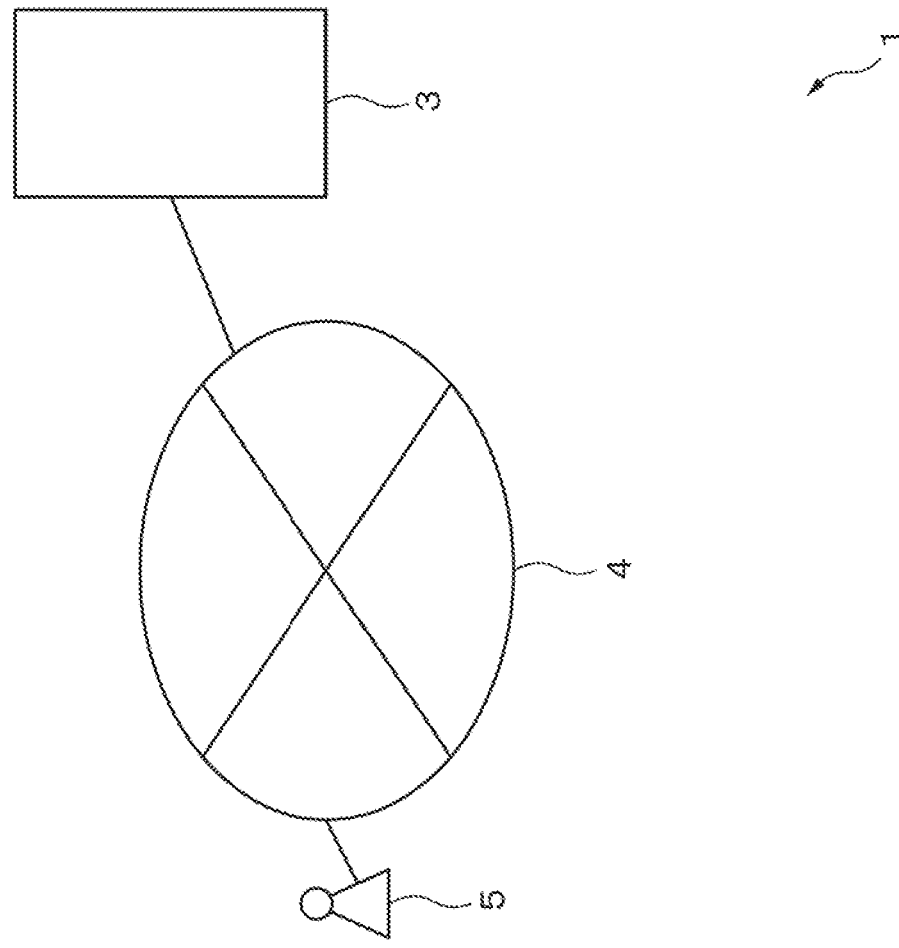
FIG. 1 schematically illustrates the configuration of a map update system equipped with an apparatus for determining sections for map update.
Figure 1:
Figure 1:
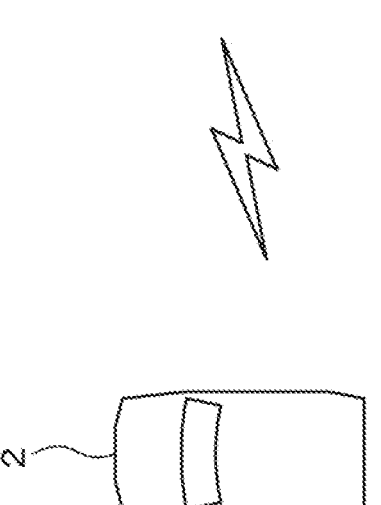

FIG. 1 schematically illustrates the configuration of a map update system equipped with the apparatus for determining sections for map update. In the present embodiment, the map update system 1 includes at least one vehicle 2 and a server 3, which is an example of the apparatus for determining sections for map update. The vehicle 2 accesses a wireless base station 5, which is connected, for example, via a gateway (not illustrated) to a communication network 4 connected with the server 3, thereby connecting to the server 3 via the wireless base station 5 and the communication network 4. FIG. 1 illustrates only a single vehicle 2, but the map update system 1 may include multiple vehicles 2. The communication network 4 may be connected with multiple wireless base stations 5. The server 3 may be communicably connected via the communication network 4 to a traffic information server (not illustrated) that manages traffic information.

Figure 2:
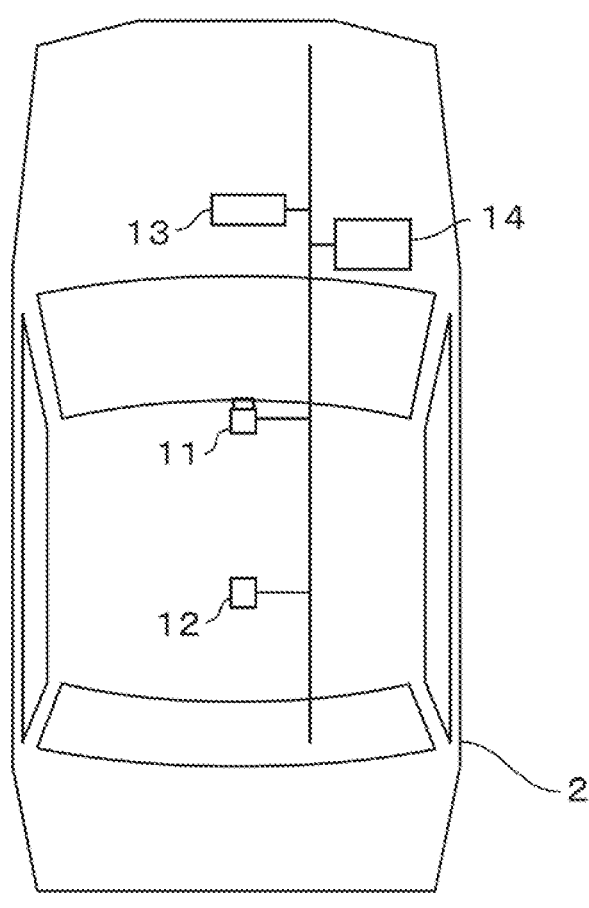
FIG. 2 schematically illustrates the configuration of a vehicle included in the map update system.

FIG. 2 schematically illustrates the configuration of the vehicle 2. The vehicle 2 includes a camera 11, a GPS receiver 12, a wireless communication terminal 13, and a data acquisition device 14, which are communicably connected via an in-vehicle network conforming to a standard such as a controller area network.

The camera 11, which is an example of an image capturing unit for capturing the surroundings of the vehicle 2, includes a two-dimensional detector constructed from an array of optoelectronic transducers, such as CCD or C-MOS, having sensitivity to visible light and a focusing optical system that forms an image of a target region of capturing on the two-dimensional detector. The camera 11 is mounted, for example, in the interior of the vehicle 2 so as to be oriented, for example, to the front of the vehicle 2. The camera 11 captures a region in front of the vehicle 2 every predetermined capturing period (e.g., 1/30 to 1/10 seconds), and generates images representing this region. The images obtained by the camera 11 may be color or grayscale images. The vehicle 2 may include multiple cameras 11 taking pictures in different orientations or having different focal lengths.

Whenever an image is generated, the camera 11 outputs the generated image to the data acquisition device 14 via the in-vehicle network.

The GPS receiver 12 receives GPS signals from GPS satellites at predetermined intervals, and determines the position of the vehicle 2, based on the received GPS signals. The GPS receiver 12 outputs positioning information indicating the result of determination of the position of the vehicle 2 based on the GPS signals to the data acquisition device 14 via the in-vehicle network at predetermined intervals. The vehicle 2 may include a receiver conforming to a satellite positioning system other than the GPS receiver 12. In this case, the receiver determines the position of the vehicle 2.

The wireless communication terminal 13 is a device to execute a wireless communication process conforming to a predetermined standard of wireless communication, and accesses, for example, the wireless base station 5 to connect to the server 3 via the wireless base station 5 and the communication network 4. The wireless communication terminal 13 receives a downlink radio signal from the wireless base station 5, and passes an instruction to collect feature data from the server 3 included in the radio signal to the data acquisition device 14. In addition, the wireless communication terminal 13 generates an uplink radio signal including feature data received from the data acquisition device 14, and transmits the uplink radio signal to the wireless base station 5 to transmit the feature data to the server 3.

Figure 3:
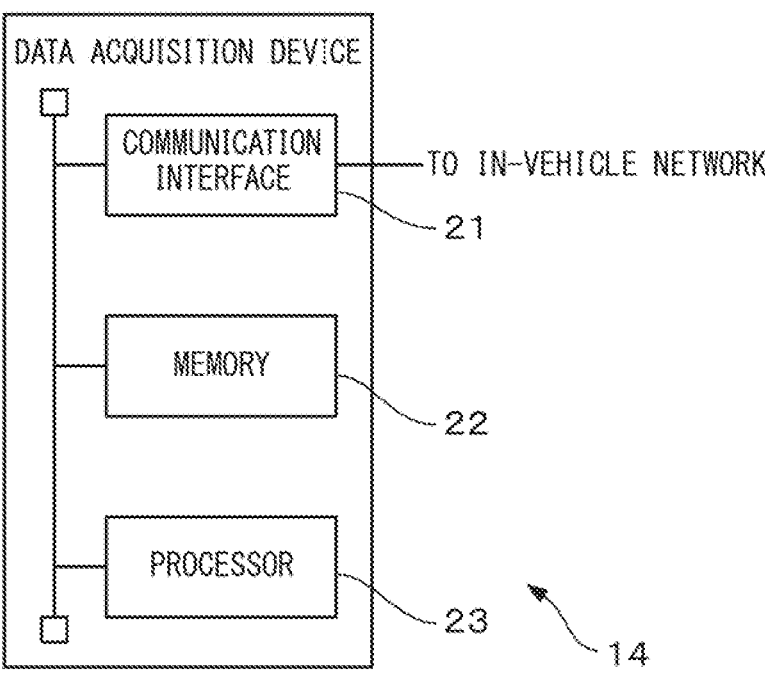
FIG. 3 illustrates the hardware configuration of a data acquisition device mounted on the vehicle.

FIG. 3 illustrates the hardware configuration of the data acquisition device. The data acquisition device 14 executes processing related to generation of feature data, based on an image generated by the camera 11. To achieve this, the data acquisition device 14 includes a communication interface 21, a memory 22, and a processor 23.

The communication interface 21 includes an interface circuit for connecting the data acquisition device 14 to the in-vehicle network. In other words, the communication interface 21 is connected to the camera 11, the GPS receiver 12, and the wireless communication terminal 13 via the in-vehicle network. Whenever an image is received from the camera 11, the communication interface 21 passes the received image to the processor 23. Whenever positioning information is received from the GPS receiver 12, the communication interface 21 passes the received positioning information to the processor 23. Further, the communication interface 21 outputs feature data received from the processor 23 to the wireless communication terminal 13 via the in-vehicle network. Further, the communication interface 21 passes to the processor 23 an instruction to collect feature data received from the server 3 via the wireless communication terminal 13.

The memory 22 includes, for example, volatile and non-volatile semiconductor memories, and may further include other storage, such as a hard disk drive. The memory 22 stores various types of data used in processing related to generation of feature data executed by the processor 23 of the data acquisition device 14. Such data includes, for example, a road map; identifying information of the vehicle 2; parameters of the camera 11, such as the height of the mounted position, the direction of image capturing, and the angle of view of the camera 11; and a set of parameters for defining a classifier for detecting a feature from an image. The road map may be, for example, a map used by a navigation device for route search, and includes information on the positions and the lengths of road sections included in a region represented in the road map as well as information on the connection relationship between road sections at individual intersections in the region. The memory 22 may also store images received from the camera 11 and positioning information received from the GPS receiver 12 for a certain period. In addition, the memory 22 stores information indicating a target road section for generating and collecting feature data (hereafter a "collection target section") specified in an instruction to collect feature data, and may further store computer programs for various processes executed by the processor 23.

The processor 23 includes one or more central processing units (CPUs) and a peripheral circuit thereof, and may further include another operating circuit, such as a logic-arithmetic unit, an arithmetic unit, or a graphics processing unit. The processor 23 stores images received from the camera 11 and positioning information received from the GPS receiver 12 in the memory 22, and executes processing related to generation of feature data at predetermined intervals (e.g., 0.1 to 10 seconds) during travel of the vehicle 2.

As the processing related to generation of feature data, for example, the processor 23 determines whether the position of the vehicle 2 indicated by positioning information received from the GPS receiver 12 is within a collection target section. When the position of the vehicle is within a collection target section, the processor 23 generates feature data, based on an image received from the camera 11.

For example, the processor 23 uses an image itself received from the camera 11 (hereafter a "whole image") as feature data. Alternatively, the processor 23 cuts out a sub-image including a region representing a road surface from a whole image received from the camera 11, and uses the cut-out sub-image as feature data. Information indicating a region assumed to represent a road surface in a whole image may be prestored in the memory 22. The processor 23 may refer to the information to identify the region to be cut out from a whole image.

Alternatively, the processor 23 may input a whole image or a sub-image into a classifier that has been trained to detect a detection target feature, thereby detecting a feature represented in the inputted whole image or sub-image (hereafter simply the "input image"). The processor 23 may then generate information indicating the type of the detected feature as feature data. As such a classifier, the processor 23 can use, for example, a "deep neural network (DNN)" that has been trained to detect a feature represented in an input image from the input image. As such a DNN, for example, a DNN having architecture of a convolutional neural network (CNN) type, e.g., Single Shot MultiBox Detector (SSD) or Faster R-CNN, is used. In this case, for each type of detection target feature (e.g., a lane-dividing line, a pedestrian crossing, and a stop line), the classifier calculates a confidence score indicating how likely the feature is represented in a region in the input image; the classifier calculates the confidence score for each of various regions in the input image. The classifier determines that a region where the confidence score for a certain type of feature is not less than a predetermined detection threshold represents the type of feature. The classifier then outputs information indicating a region including the detection target feature in the input image, e.g., a circumscribed rectangle of the detection target feature (hereafter an "object region") and information indicating the type of the feature represented in the object region. The processor 23 generates feature data so as to include the information indicating the type of the feature represented in the detected object region.

In addition, the processor 23 identifies the real-space position of the location or the feature represented in feature data, and includes information indicating this position in the feature data. For example, the processor 23 uses the position of the vehicle 2 at the time of generation of the image used for generating feature data as the position of the location represented in the feature data. Specifically, the processor 23 can use the position indicated by positioning information received from the GPS receiver 12 at the timing closest to the time of generation of the image used for generating the feature data as the position of the vehicle 2. Alternatively, in the case where an electronic control unit (ECU, not illustrated) of the vehicle 2 estimates the position of the vehicle 2, the processor 23 may obtain information indicating an estimated position of the vehicle 2 from the ECU via the communication interface 21. The processor 23 further obtains information indicating the travel direction of the vehicle 2 from the ECU. Further, the positions of pixels in an image correspond one-to-one to the directions from the camera 11 to objects represented in the respective pixels. Thus, when the feature data is a whole image or a sub-image, the processor 23 may estimate the real-space position corresponding to the center of the whole image or the sub-image as the position of the location represented in the feature data. In this case, the processor 23 estimates the position of the location corresponding to the center of the whole image or the sub-image, based on the direction with respect to the camera 11, the position and the travel direction of the vehicle 2, and the parameters of the camera 11, such as the direction of image capturing, the angle of view, and the height of the mounted position. Alternatively, when the feature data includes information indicating the type of feature detected from an image, the processor 23 estimates the position of the feature represented in an object region, based on the direction from the camera 11 to the position corresponding to the centroid of the object region, the position and the travel direction of the vehicle 2, and the parameters of the camera 11. As another option, the processor 23 may estimate the position of a feature represented in feature data by "structure from motion (SfM)." In this case, the processor 23 associates object regions representing the same feature in two images obtained at different timings with each other, using optical flow. The processor 23 can estimate the position of the feature by triangulation, based on the positions and the travel directions of the vehicle 2 at the times of acquisition of the two images, the parameters of the camera 11, and the positions of the object regions in the respective images.

The processor 23 includes, in feature data, the latitude and longitude indicating the position of the location or the feature represented in the feature data as information indicating the position of the location or the feature represented in the feature data. In addition, the processor 23 identifies a road section or a link including or lying closest to the position of the location or the feature represented in the feature data, by referring to the road map. The processor 23 may then include the identification number of the identified link in the feature data. When the feature data is a whole image or a sub-image, the processor 23 may further include the position and the travel direction of the vehicle 2 at the time of generation of the image and the parameters of the camera 11 in the feature data so that the server 3 can estimate the position of the feature represented in the whole image or the sub-image.

Whenever feature data is generated, the processor 23 outputs the generated feature data to the wireless communication terminal 13 via the communication interface 21. In this way, feature data is transmitted to the server 3.

The following describes the server 3, which is an example of the apparatus for determining sections for map update.

Figure 4:
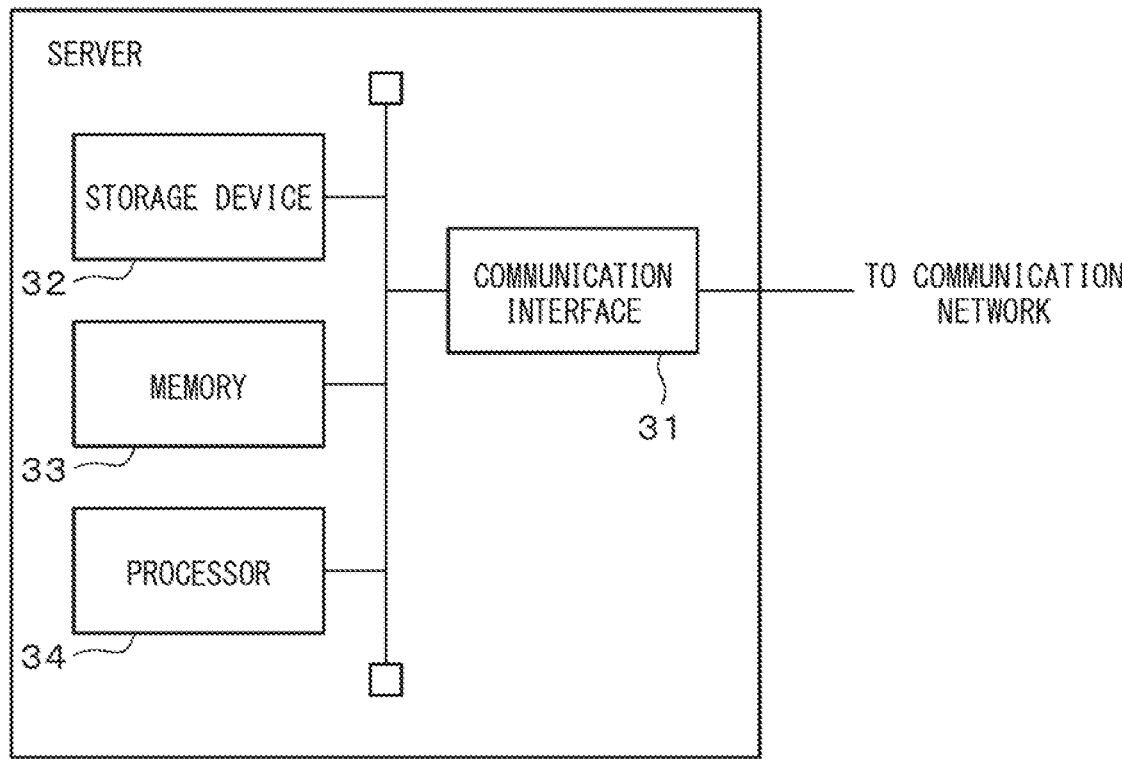
FIG. 4 illustrates the hardware configuration of a server, which is an example of the apparatus for determining sections for map update.

FIG. 4 illustrates the hardware configuration of the server 3, which is an example of the apparatus for determining sections for map update. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of a communication unit, includes an interface circuit for connecting the server 3 to the communication network 4, and is configured to be communicable with the vehicle 2 via the communication network 4 and the wireless base station 5. More specifically, the communication interface 31 transmits a collection instruction received from the processor 34 to the vehicle 2 via the communication network 4 and the wireless base station 5. In addition, the communication interface 31 passes to the processor 34 feature data received from the vehicle 2 via the wireless base station 5 and the communication network 4.

The storage device 32, which is an example of the storage unit, includes, for example, a hard disk drive, or an optical medium and an access device therefor, and stores various types of data and information used in a section determination process for map update. For example, the storage device 32 stores information indicating a target region for generating or updating map information, a road map, information for identifying individual road sections, and information representing the connection relationship between individual road sections. As described above, the road map is a map used by a navigation device for route search. For each road section, the storage device 32 further stores a map flag, an autonomous driving cost, a manual driving cost, a traffic volume, and a map preparation cost. In addition, the storage device 32 stores a target value of the total of map preparation costs usable for generating or updating the map information (hereafter a "target preparation cost") and a table representing the relationship between a traffic volume and a weighting factor, which depends on the traffic volume and is used for calculating scores. The weighting factor will be explained below. The storage device 32 further stores feature data received from the vehicle 2, and may also store a computer program for the processor 34 to execute the section determination process.

Individual road sections may be, for example, individual links or nodes represented in the road map. More specifically, a section of a road from a location where multiple roads cross, diverge, or merge (hereafter a "crossing/merging point" for the sake of convenience), such as an intersection or an interchange, to an adjacent crossing/merging point is set as a single road section. Such a road section, if longer than a predetermined distance, may be divided into multiple road sections. A crossing/merging point is also set as a single road section.

The map flag indicates whether the map information is available for a vehicle to travel through the road section corresponding to the map flag by autonomous driving. More specifically, a map flag having a value indicating that the map information is available (e.g., 1) suggests that the map information includes information on features sufficient for autonomous driving of a vehicle in the road section corresponding to the map flag. In contrast, a map flag having a value indicating that the map information is unavailable (e.g., 0) suggests that the map information does not include information on features necessary for autonomous driving of a vehicle in the road section corresponding to the map flag.

The autonomous driving cost and the manual driving cost are set for each road section so as to have larger values as a driver's load is heavier. The autonomous driving cost indicates a driver's load for the case where a vehicle travels through a corresponding road section by autonomous driving using the map information, and is set, for example, as the value of the product of a cost of travel by autonomous driving per unit time and an average time required to pass through the corresponding road section. Since a driver's load during travel by autonomous driving is not so heavy, the autonomous driving cost may be 0. The manual driving cost indicates a driver's load in the case where a vehicle travels through a corresponding road section by the driver's manual driving, and is set, for example, as the value of the product of a cost of travel by manual driving per unit time and an average time required to pass through the corresponding road section. Since a driver's load in the case of travel by manual driving is generally heavier than that in the case of travel by autonomous driving, the manual driving cost is higher than the autonomous driving cost on the same road section. Regarding a road section including a crossing/merging point, the map flag, the autonomous driving cost, and the manual driving cost are set for each combination of those roads connected to the road section which are travelable by vehicles. For example, regarding a road section including an intersection, the map flag, the autonomous driving cost, and the manual driving cost are set, for each road connected to the intersection, for each of the straight, right-turn, and left-turn directions with respect to the road. However, when traveling straight, turning right, or turning left is prohibited on a road connected to an intersection, the map flag, the autonomous driving cost, and the manual driving cost do not need to be set with regard to the direction in which entry is prohibited.

The map preparation cost is a cost required to generate or update the map information regarding a corresponding road section. The map preparation cost of a road section that does not include a crossing/merging point is set at a larger value as the corresponding road section is longer or includes more lanes. The map preparation cost of a road section including a crossing/merging point is set, for each combination of those roads connected at the crossing/merging point along which vehicles can travel through the crossing/merging point, at a value proportional to the number of lanes of the combination.

The traffic volumes of individual road sections are obtained, for example, from a traffic information server via the communication network 4.

The memory 33, which is another example of the storage unit, includes, for example, nonvolatile and volatile semiconductor memories. The memory 33 temporarily stores various types of data generated during execution of the section determination process.

The processor 34, which is an example of a control unit, includes one or more central processing units (CPUs) and a peripheral circuit thereof. The processor 34 may further include another operating circuit, such as a logic-arithmetic unit or an arithmetic unit. The processor 34 executes a map update process including the section determination process.

Figure 5:
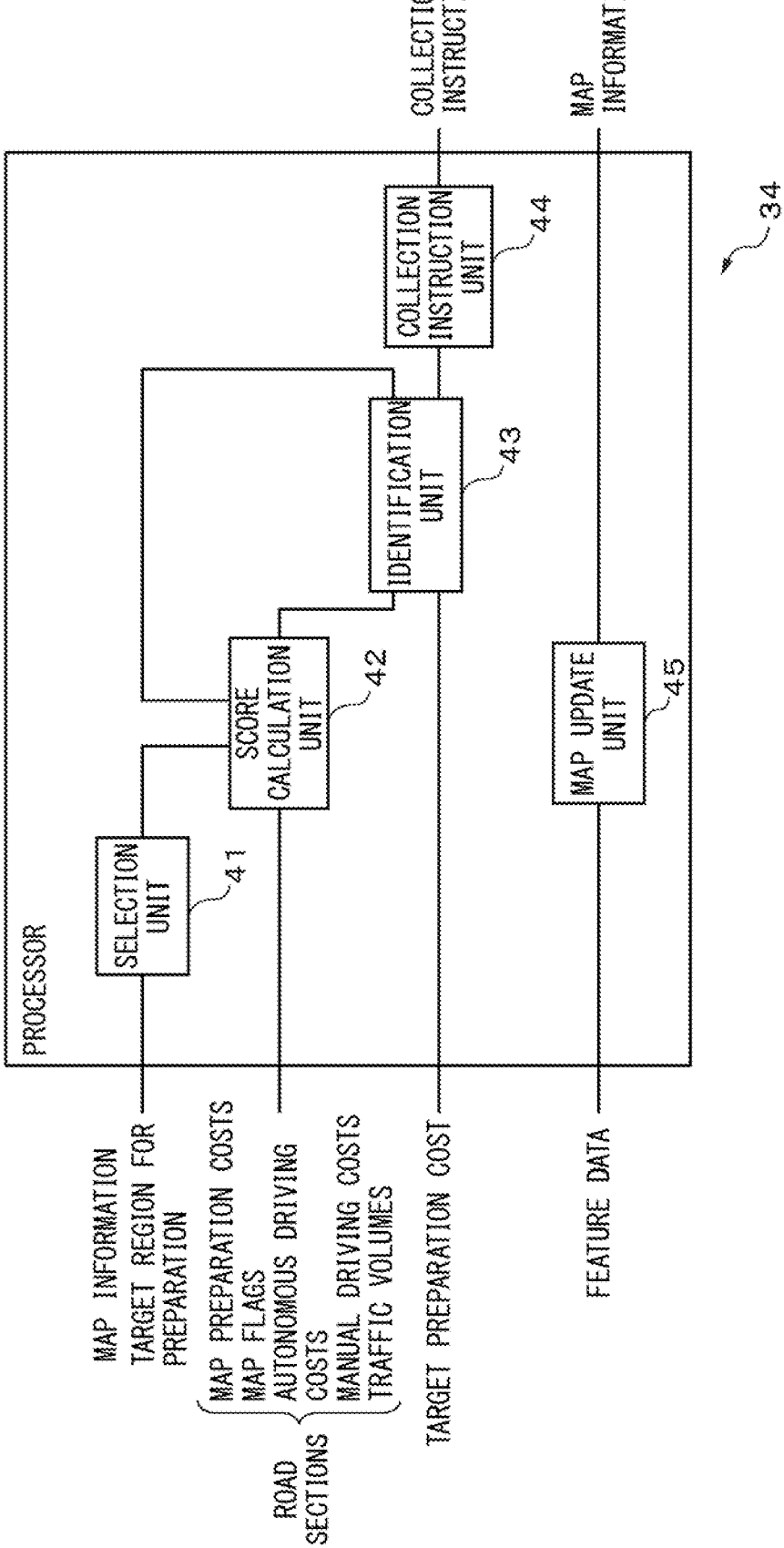
FIG. 5 is functional block diagram of a processor of the server, related to a map update process including a section determination process for map update.

FIG. 5 is a functional block diagram of the processor 34, related to the map update process including the section determination process. The processor 34 includes a selection unit 41, a score calculation unit 42, an identification unit 43, a collection instruction unit 44, and a map update unit 45. These units included in the processor 34 are functional modules, for example, implemented by a computer program executed by the processor 34, or may be dedicated operating circuits provided in the processor 34. Of these units included in the processor 34, the selection unit 41, the score calculation unit 42, and the identification unit 43 execute processing related to the section determination process.

The selection unit 41 selects pairs of two locations from among a plurality of locations at which vehicles can enter or exit a target region for generating or updating the map information. For each selected pair of two locations, the selection unit 41 selects a series of road sections connecting the two locations from among a plurality of road sections included in the region as a route connecting the two locations.

The selection unit 41 can identify the plurality of locations at which vehicles can enter or exit the target region for generating or updating the map information, by referring to the road map. The selection unit 41 selects pairs of two locations from the plurality of locations at random. Specifically, the selection unit 41 may select all possible pairs, or all possible pairs of two locations satisfying a predetermined condition among the plurality of locations at which vehicles can enter or exit the region. The predetermined condition may be, for example, that entry and exit is possible at the location through a road satisfying a predetermined road standard. Alternatively, the predetermined condition may be that entry and exit is possible at the location through a road having a traffic volume not less than a predetermined volume.

For each selected pair of two locations, the selection unit 41 searches for a route connecting the two locations by referring to the road map in accordance with a predetermined route searching technique, such as Dijkstra's algorithm. In this way, for each selected pair of two locations, the shortest route connecting the two locations or a route through which a vehicle may travel between the two locations in the shortest time is selected. For each selected pair of two locations, the selection unit 41 then selects a series of road sections on the route connecting the two locations.

For each selected pair of two locations, the selection unit 41 notifies the score calculation unit 42 and the identification unit 43 of information indicating the series of road sections on the route connecting the two locations.

The score calculation unit 42 calculates, for each pair of two locations notified by the selection unit 41, a score indicating the degree of improvement of drivers' convenience provided by preparing the map information regarding the route connecting the two locations. The following describes a score calculation process for a single pair because the score calculation unit 42 executes the same process on individual pairs of two locations.

The score calculation unit 42 identifies an unprepared section among individual road sections included in the route between the two locations as a road section to be referred to at calculating the score, by referring to the map flag. A road section that is an unprepared section at present but has been selected by the identification unit 43 as a target road section for generating or updating the map information is not referred to at calculating the score. In the following, road sections to be referred to at calculating the score, i.e., road sections that are candidates for targets for generating or updating the map information will be referred to simply as "candidate sections."

The score calculation unit 42 weights the difference obtained by subtracting the autonomous driving cost from the manual driving cost with the ratio of the traffic volume to the map preparation cost for each identified candidate section, and calculates the total of the weighted differences as a score. More specifically, the score is calculated as the total of individual-section scores Ei of individual candidate sections on the route expressed by the following equation.

$$Ei=(Mc-Ac)^*Tv/Sc$$

Parameter Ac denotes the autonomous driving cost of a candidate section of interest. Parameter Mc denotes the manual driving cost of the candidate section of interest. Parameter Tv denotes a weighting factor depending on the traffic volume of the candidate section of interest. Parameter Tv is set at a larger value, for example, as the traffic volume of the candidate section of interest is greater. Parameter Sc denotes the map preparation cost of the candidate section of interest. When the autonomous driving cost is set at 0, the individual-section score Ei is calculated as a value of the manual driving cost weighted with the ratio of the traffic volume to the map preparation cost, as indicated by the above-described equation.

The individual-section score Ei has a larger value as the difference between the manual driving cost and the autonomous driving cost or the traffic volume is greater. In other words, the individual-section score Ei has a larger value in a road section where enabling autonomous driving by generating or updating the map information reduces drivers' load more greatly or allows more vehicles to have the advantage of autonomous driving control. Additionally, the individual-section score Ei has a larger value in a road section where the map preparation cost is lower. Thus, in a route having a higher score, the degree of improvement of drivers' convenience provided by generating or updating the map information at a lower map preparation cost is higher, and the efficiency of preparation is higher.

The score calculation unit 42 notifies the identification unit 43 of the calculated score for each of the pairs of two locations.

The identification unit 43 identifies unprepared sections on the route of each of a predetermined number of pairs among the pairs of two locations notified by the selection unit 41 in descending order of the score as target road sections for generating or updating the map information.

To achieve this, the identification unit 43 identifies a pair corresponding to the maximum of the scores of the respective pairs of two locations notified by the score calculation unit 42, i.e., a pair that maximizes the degree of improvement of drivers' convenience. The identification unit 43 then identifies unprepared sections on the route of the identified pair as target road sections for generating or updating the map information.

The identification unit 43 calculates the total of the map preparation costs of the road sections identified as targets for generating or updating the map information, as an accumulated preparation cost. The identification unit 43 then determines whether the accumulated preparation cost is less than a target preparation cost. When the accumulated preparation cost has reached the target preparation cost, the identification unit 43 finishes identifying target road sections for generating or updating the map information. When the accumulated preparation cost is less than the target preparation cost, the identification unit 43 notifies the score calculation unit 42 of the identified road sections. The identification unit 43 excludes the identified road sections and the pair of two locations that maximizes the score from the targets for calculating the score, and then causes the score calculation unit 42 to calculate the score again for each pair of two locations.

The identification unit 43 executes the above-described process again, based on the scores re-calculated for each of the pairs of two locations, thereby further identifying target road sections for generating or updating the map information. The identification unit 43 then adds the total of the map preparation costs of the identified road sections to the accumulated preparation cost. The identification unit 43 repeats the above-described process until the accumulated preparation cost reaches the target preparation cost. When the accumulated preparation cost becomes not less than the target preparation cost, the identification unit 43 finishes identifying target road sections for generating or updating the map information.

Figure 6:
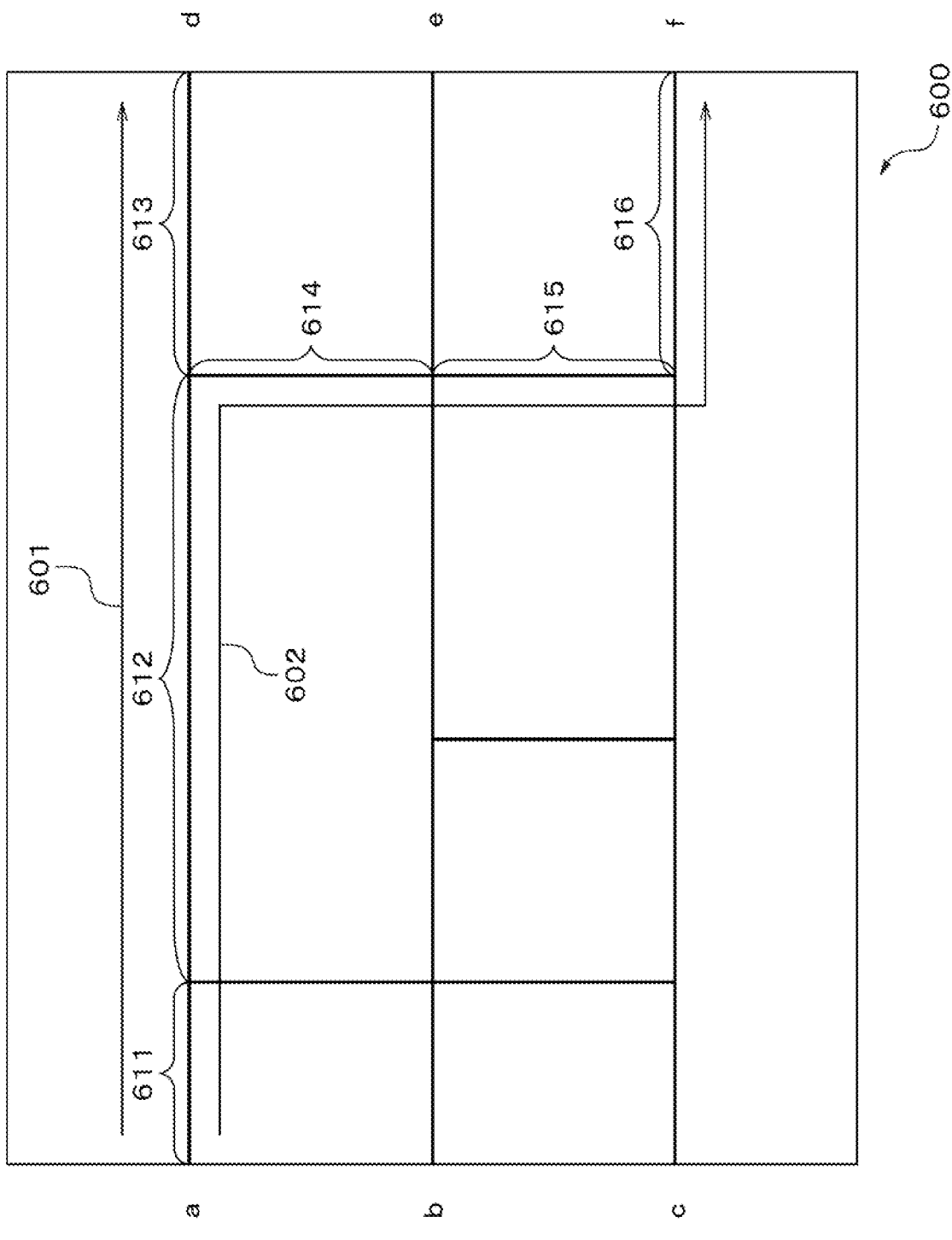
FIG. 6 is a schematic diagram for explaining calculation of a score.

FIG. 6 is a schematic diagram for explaining selection of target road sections for generating or updating map information. In the example illustrated in FIG. 6, there are six locations 'a' to 'f' at which vehicles can enter or exit a target region 600 for generating or updating the map information. Thus, for each pair of two locations selected from these six locations 'a' to 'f', the selection unit 41 selects a route connecting the two locations. For each pair of two locations, the score calculation unit 42 then calculates a score of a route connecting the two locations. In this example, assume that the score of a route 601 connecting locations 'a' and 'd' is the highest. Thus the identification unit 43 selects road sections 611, 612, and 613 on the route 601 as target road sections for generating or updating the map information. In this example, assume that the accumulated preparation cost, which is the total of the map preparation costs of the road sections 611 to 613, has not reached a target preparation cost. Thus, the route 601 and the road sections on the route 601 are excluded from the targets for calculating the score, and the score is re-calculated for each of the remaining pairs of two locations. Assuming that, of the remaining pairs of two locations, the score of a route 602 connecting locations 'a' and 'f' is the highest. In this case, of the road sections 611, 612, 614, 615, and 616 on the route 602, the road sections 614 to 616 are newly added as target road sections for generating or updating the map information. When the accumulated preparation cost, which is the total of the map preparation costs of the road sections 611 to 616, has reached the target preparation cost, the identification unit 43 finishes selecting target road sections for generating or updating the map information.

The identification unit 43 notifies the collection instruction unit 44 of information for identifying the road sections identified as target road sections for generating or updating the map.

The collection instruction unit 44 generates an instruction to collect feature data regarding the target road sections for generating or updating the map information notified by the identification unit 43. More specifically, the collection instruction unit 44 generates the collection instruction so as to include information for identifying the target road sections for generating or updating the map information. The collection instruction unit 44 then transmits the generated collection instruction to the vehicle 2 via the communication interface 31.

The map update unit 45 adds information on features represented in collected feature data to the map information read from the storage device 32 for each target road section for generating or updating the map information, thereby generating or updating the map information. For example, when the feature data is a whole image or a sub-image, the map update unit 45 detects a feature and its type from the whole image or the sub-image and estimates the position of the detected feature by executing the same process as is executed by the data acquisition device 14 mounted on the vehicle 2. The map update unit 45 then identifies the average of those positions of features of the same type in a predetermined area which are included in the collected feature data or estimated as described above as the position of the features. For each feature whose position is identified, the map update unit 45 includes information indicating the type and the identified position of the feature in the map information to update the map information.

FIG. 7 is an operation flowchart of the section determination process by the server 3. The processor 34 of the server 3 executes the section determination process in accordance with the operation flowchart described below.

The selection unit 41 of processor 34 selects pairs of two locations from among a plurality of locations at which vehicles can enter or exit a target region for generating or updating map information (step S101). For each selected pair of two locations, the selection unit 41 searches for a route connecting the two locations, and selects a series of road sections on the searched route (step S102).

For each of the pairs of two locations, the score calculation unit 42 of processor 34 calculates a score indicating the degree of improvement of drivers' convenience provided by generating or updating the map information regarding the route connecting the two locations (step S103).

The identification unit 43 of processor 34 selects unprepared sections among the road sections on a route corresponding to the maximum of the calculated scores as target road sections for generating or updating the map information (step S104). The identification unit 43 then determines whether the accumulated preparation cost of the already identified road sections that are targets for generating or updating the map information is less than a target preparation cost (step S105). When the accumulated preparation cost is less than the target preparation cost (Yes in step S105), the processor 34 excludes the already identified pairs of two locations and road sections that are targets for generating or updating the map information, and then repeats the processing of step S103 and the subsequent steps.

When the accumulated preparation cost has reached the target preparation cost (No in step S105), the processor 34 terminates the section determination process. After termination of the section determination process, the collection instruction unit 44 of the processor 34 generates an instruction to collect feature data regarding the target road sections for generating or updating the map information, and transmits the generated collection instruction to the vehicle 2 via the communication interface 31. When the amount of collected feature data of the target road sections for generating or updating the map information reaches or exceeds a predetermined amount, the map update unit 45 of the processor 34 adds information on features represented in the collected feature data to the map information for each target road section for generating or updating the map information.

As has been described above, the apparatus for determining sections for map update selects, for each of pairs of two locations at which vehicles can enter or exit a target region for generating or updating map information, a series of road sections connecting the two locations as a route connecting the two locations. For each of the pairs of two locations, the apparatus further calculates a score indicating the degree of improvement of drivers' convenience provided by generating or updating the map information regarding the route connecting the two locations. The apparatus then identifies unprepared sections on the route between each pair of two locations in descending order of the calculated score as target road sections for generating or updating the map information until the accumulated value of the map preparation costs reaches a target preparation cost. Thus the apparatus can determine target road sections for generating or updating the map information so that drivers are likely to have the advantage of autonomous driving control. In addition, hardware resources used for determining target road sections for generating or updating the map information can be reduced because the apparatus can determine the road sections without calculating scores for all combinations of road sections.

According to a modified example, the score calculation unit 42 may calculate the score without taking account of the map preparation cost. For example, the score calculation unit 42 may calculate the score as the total of the following individual-section scores Ei of individual candidate sections on a route.

$$Ei=(Mc-Ac)*Tv$$

In this modified example also, the apparatus for determining sections for map update has the same advantageous effect as the apparatus of the embodiment.

According to another modified example, the score calculation unit 42 may calculate the individual-section score Ei of each candidate section on a route in accordance with the following equation.

$$Ei=(Ac-Mc)*Tv/Sc$$

In this case, since the term (Ac−Mc) is probably negative, the degree of improvement of drivers' convenience provided by generating or updating the map information is higher as the score is lower. For this reason, a pair corresponding to the minimum of the scores of the respective pairs of two locations selected by the selection unit 41 maximizes the degree of improvement of drivers' convenience. Thus, in this modified example, the identification unit 43 identifies routes including target road sections for generating or updating the map information, sequentially from the route of a pair that minimizes the score, until the accumulated preparation cost reaches the target preparation cost.

The computer program for causing a computer to execute processing of the units executed by the processor 34 of the server 3 according to the embodiment or modified examples may be distributed in a form recorded on a semiconductor memory device, a magnetic medium, or an optical medium.

As described above, those skilled in the art may make various modifications according to embodiments within the scope of the present invention.

What is claimed is:

1. An apparatus for determining sections for map update, comprising:

a memory configured to store, for each of a plurality of road sections included in a predetermined region, a map flag indicating whether map information for a vehicle to travel through the road section by autonomous driving is available; and a processor configured to:

determine a plurality of pairs respectively comprising a starting location and an ending location selected from among a plurality of locations at which vehicles can enter or exit the predetermined region;

select, for each of the plurality of pairs, a series of road sections connecting the two locations from among the plurality of road sections as a route between the two locations, identify, for each of the pairs of two locations, one or more road sections where the map information is unavailable among individual road sections included in the route between the two locations as one or more candidate sections by referring to the map flag, calculate, for each of the pairs of two locations, a score indicating the degree of improvement of drivers' convenience provided by generating or updating the map information, based on the candidate sections, identify the candidate sections included in the route of each of a predetermined number of pairs among the pairs of two locations in descending order of the degree of improvement of drivers' convenience indicated by the score as target road sections for generating or updating the map information; and update the candidate section of the map included in a pair among the predetermined number of pairs with the highest score; and control the autonomous driving of the vehicle based on the updated map.

2. The apparatus according to claim 1, wherein for each of the plurality of road sections, the memory further stores a traffic volume of the road section, an autonomous driving cost indicating a driver's load in the case where a vehicle travels through the road section by autonomous driving using the map information, a manual driving cost indicating a driver's load for the case where a vehicle travels through the road section by the driver's manual driving, and a map preparation cost required to generate or update the map information regarding the road section, and for each of the pairs of two locations, the processor calculates the total of differences between the manual driving cost and the autonomous driving cost of each of the candidate sections included in the route of the pair as the score, each of the differences being weighted with the ratio of the traffic volume to the map preparation cost.

3. The apparatus according to claim 1, wherein for each of the plurality of road sections, the memory further stores a traffic volume of the road section, an autonomous driving cost indicating a driver's load for the case where a vehicle travels through the road section by autonomous driving using the map information, and a manual driving cost indicating a driver's load in the case where a vehicle travels through the road section by the driver's manual driving, and for each of the pairs of two locations, the processor calculates the total of differences between the manual driving cost and the autonomous driving cost of each of the candidate sections included in the route of the pair as the score, each of the differences being weighted with the traffic volume.

4. The apparatus according to claim 1, wherein for each of the plurality of road sections, the memory further stores a traffic volume of the road section, a manual driving cost indicating a driver's load in the case where a vehicle travels through the road section by the driver's manual driving, and a map preparation cost required to generate or update the map information regarding the road section, and for each of the pairs of two locations, the processor calculates the total of values of the manual driving cost of each of the candidate sections included in the route of the pair as the score, each of the values being weighted with the ratio of the traffic volume to the map preparation cost.

5. The apparatus according to claim 1, wherein for each of the plurality of road sections, the memory further stores a map preparation cost required to generate or update the map information regarding the road section, and until the sum of the map preparation costs of road sections identified as target road sections for generating or updating the map information reaches a target preparation cost, the processor identifies the candidate sections included in the route of each of the pairs among the pairs of two locations in descending order of the degree of improvement of drivers' convenience indicated by the score as target road sections for generating or updating the map information.

6. A method for determining sections for map update, comprising:

determining a plurality of pairs respectively comprising a starting location and an ending location selected from among a plurality of locations at which vehicles can enter or exit the predetermined region;

selecting, for each of the plurality of pairs, a series of road sections connecting the two locations from among a plurality of road sections included in the predetermined region as a route between the two locations;

identifying, for each of the pairs of two locations, one or more candidate sections among individual road sections included in the route between the two locations by referring to a map flag indicating, for each road section included in the route of the pair, whether map information for a vehicle to travel through the road section by autonomous driving is available, wherein the candidate sections are road sections where the map information is unavailable;

calculating, for each of the pairs of two locations, a score indicating the degree of improvement of drivers' convenience provided by generating or updating the map information, based on the candidate sections;

identifying the candidate sections included in the route of each of a predetermined number of pairs among the pairs of two locations in descending order of the degree of improvement of drivers' convenience indicated by the score as target road sections for generating or updating the map information;

updating the candidate section of the map included in a pair among the predetermined number of pairs with the highest score; and controlling the autonomous driving of the vehicle based on the updated map.

7. A non-transitory recording medium that stores a computer program for determining sections for map update, the computer program causing a computer to execute a process comprising:

determining a plurality of pairs respectively comprising a starting location and an ending location selected from among a plurality of locations at which vehicles can enter or exit the predetermined region;

selecting, for each of the plurality of pairs, a series of road sections connecting the two locations from among a plurality of road sections included in the predetermined region as a route between the two locations;

identifying, for each of the pairs of two locations, one or more candidate sections among individual road sections included in the route between the two locations by referring to a map flag indicating, for each road section included in the route of the pair, whether map information for a vehicle to travel through the road section by autonomous driving is available, wherein the candidate sections are road sections where the map information is unavailable;

calculating, for each of the pairs of two locations, a score indicating the degree of improvement of drivers' convenience provided by generating or updating the map information, based on the candidate sections;

identifying the candidate sections included in the route of each of a predetermined number of pairs among the pairs of two locations in descending order of the degree of improvement of drivers' convenience indicated by the score as target road sections for generating or updating the map information;

updating the candidate section of the map included in a pair among the predetermined number of pairs with the highest score; and controlling the autonomous driving of the vehicle based on the updated map.

\* \* \* \* \*